US012752644B2

(12) United States Patent

Prasad et al.

(10) Patent No.: US 12,752,644 B2

(45) Date of Patent: Oct. 6, 2026

(54) VEHICLE-TO-VEHICLE CHARGING BOX AND METHOD FOR DIRECT CURRENT FAST-CHARGING USING THE SAME

(71) Applicant: GM GLOBAL TECHNOLOGY OPERATIONS LLC, Detroit, MI (US)

(72) Inventors: Rashmi Prasad, Troy, MI (US); Chandra S. Namuduri, Troy, MI (US); Ramadityanand Bhogadi, Rochester Hills, MI (US); Sandeep U. Menon, Troy, MI (US); Ananth Padmanabha Rao Vemuri, White Lake, MI (US); Aniket P. Kothari, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 688 days.

(21) Appl. No.: 18/355,040

(22) Filed: Jul. 19, 2023

(65) Prior Publication Data

US 2025/0026208 A1 Jan. 23, 2025

(51) Int. Cl.

*B60L 53/10* (2019.01)

*B60L 53/18* (2019.01)

(Continued)

(52) U.S. Cl.

CPC ............... *B60L 53/11* (2019.02); *B60L 53/18* (2019.02); *B60L 53/57* (2019.02); *B60L 53/66* (2019.02);

(Continued)

(58) Field of Classification Search

CPC ...... B60L 53/18; B60L 2210/10; B60L 53/16; H02J 7/342

See application file for complete search history.

(56) References Cited

U.S. PATENT DOCUMENTS 9,114,716 B2 * 8/2015 Loftus ........................ B60L 3/00

2014/0084843 A1 * 3/2014 Pham .................... B60L 53/305 903/903

(Continued)

FOREIGN PATENT DOCUMENTS

DE 102021122038 A1 3/2022

DE 112021004888 T5 6/2023

*Primary Examiner* — Christle I Marshall

(74) *Attorney, Agent, or Firm* — Quinn IP Law

(57) ABSTRACT

A charging box performs a direct current fast charging (DCFC) session of a recipient by a donor, e.g., during a vehicle-to-vehicle (V2V) charging session, and includes a portable housing, disconnect devices connected to a high-voltage (HV) bus to connect/disconnect respective inlet and outlet charging ports to/from the bus, and multiple direct current-to-direct current (DC-DC) converters. A high-voltage-to-high-voltage (HV-HV) converter is connected to the bus. An optional high-voltage-to-low-voltage (HV-LV) converter may be connected to the HV-HV converter. An optional low-voltage (LV) energy storage device is connected to the housing and HV-LV converter. A communication processing unit (CPU) establishes two-way communication between the donor and recipient. A system controller selectively pre-charges the bus, recharge the energy storage device, and selectively command offloading of a DC charging current from the donor, through the HV-HV converter, and to the recipient.

20 Claims, 5 Drawing Sheets

(51) Int. Cl.

| | |
|---|---|
| ***B60L 53/57*** | (2019.01) |
| ***B60L 53/66*** | (2019.01) |
| ***H02J 7/34*** | (2006.01) |
| *B60L 53/302* | (2019.01) |

(52) U.S. Cl.

CPC ............. *H02J 7/342* (2020.01); *B60L 53/302* (2019.02); *B60L 2210/10* (2013.01)

(56) References Cited

U.S. PATENT DOCUMENTS

| | | | | |
|---|---|---|---|---|
| 2014/0184141 | A1* | 7/2014 | Loftus | B60L 3/00<br>320/104 |
| 2020/0086747 | A1* | 3/2020 | Bhat | B60L 53/30 |
| 2022/0089055 | A1* | 3/2022 | TenHouten | B60L 53/16 |
| 2022/0126724 | A1* | 4/2022 | O'Connor | B60L 53/16 |
| 2022/0194253 | A1* | 6/2022 | Salter | B60L 53/18 |
| 2022/0247185 | A1 | 8/2022 | Erikson | |

* cited by examiner

Comm Processing Unit (CPU)

VEHICLE-TO-VEHICLE CHARGING BOX AND METHOD FOR DIRECT CURRENT FAST-CHARGING USING THE SAME

INTRODUCTION

Plug-in hybrid electric vehicles, full electric vehicles, and extended-range electric vehicles, collectively referred to herein as EVs for simplicity, are equipped with an electrified powertrain system. One or more electric traction motors of the electrified powertrain system are energized by a controlled discharge of a high-voltage traction battery pack. An energized traction motor generates output torque, which in turn is directed to one or more road wheels of the EV. The EV is thus propelled along a road surface by the electrically-driven rotation of the road wheels.

Constituent electrochemical battery cells of a depleted traction battery pack of a typical EV may be selectively recharged using an offboard plug-in charging process, with some battery packs also being rechargeable during EV operation via regenerative braking or other regenerative functions. As appreciated in the art, offboard charging requires the battery pack to be electrically connected to an alternating current (AC) or direct current (DC) Electric Vehicle Supply Equipment (EVSE) charging station via a charging cable. After communication and control circuitry of the charging station and the EV establish two-way communications in accordance with a suitable charging protocol, the charging station offloads a charging current to the depleted battery pack to thereby charge the individual cells of the battery pack to a threshold state of charge or voltage capability.

SUMMARY

Disclosed herein is a portable charging circuit accessory, hereinafter referred to as a charging box for simplicity, and a corresponding method for performing charging operations between a charge-providing system ("donor") and a charge-receiving system ("recipient") using the charging box. The underlying charging architecture, circuitry, and charging strategy as described in detail herein enables high-voltage energy transfer to occur between the donor and recipient systems, e.g., full battery electric vehicles or plug-in hybrid electric vehicles (EVs), or possibly between two battery electric systems in non-EV extensions of the present teachings.

In a particular embodiment, a charging box for performing a direct current fast charging (DCFC) session of the recipient by the donor, the charging box includes a portable housing having an inlet charging port and an outlet charging port that are connectable to the donor and the recipient, respectively. The charging box also includes a high-voltage (HV) bus, first and second sets of HV disconnect devices connected to the HV bus that are configured to connect/disconnect the respective inlet and outlet charging ports to/from the HV bus, and one or more direct current-to-direct current (DC-DC) converters connected to the portable housing. The DC-DC converter(s) include a high-voltage-to-high-voltage (HV-HV) converter connected to the HV bus, and in some embodiments also include a high-voltage-to-low-voltage (HV-LV) converter connected to the HV-HV converter.

Additionally, an optional low-voltage (LV) energy storage device could be connected to the portable housing and the above-noted HV-LV converter when used, or the charging box could be connected to available 12V power, e.g., on a vehicle in such a host system. A communication processing unit (CPU) is configured to establish and maintain two-way communication between the donor and the recipient during the DCFC charging session. A system controller is configured, during the DCFC charging session, to selectively pre-charge the HV bus between the inlet charging port and the HV-HV converter if needed, to recharge the optional LV energy storage device when such a device is used, and to selectively command an offloading of a DC charging current from a battery pack of the donor, through the HV-HV converter, and to a battery pack of the recipient.

The portable housing in one or more embodiments defines a housing volume. In such an instance, the HV-HV converter, the CPU, and the system controller collectively form part of a charging circuit positioned within the housing volume.

The first and second sets of HV disconnect devices may include a first set of HV contactors and a second set of HV contactors connected to the inlet charging port and the outlet charging port by a corresponding fuse.

The optional LV energy storage device may include a 12-15 volt battery pack in one or more embodiments, or a 12-15 volt ultracapacitor or supercapacitor.

The HV-HV converter may be configured as a buck-boost converter.

An aspect of the disclosure includes a human-machine interface (HMI) connected to the portable housing. The HMI is configured to receive user inputs to the system controller during the DCFC session, and to display information pertaining to the DCFC session.

The charging box may also include a thermal management system operable for regulating a temperature of the multiple DC-DC converters.

The aforementioned CPU includes corresponding communication stacks for the donor and the recipient, and an application layer connected to the communication stacks to facilitate the two-way communication between the donor and the recipient.

The system controller for its part may quantify the DCFC charging session as a quantified session upon completion thereof, to generate a summary of charges for the DCFC charging session based on the quantified session, and to communicate the summary of charges to a user of the recipient. The system controller may also optionally perform an adaptive self-learning algorithm to analyze charging behavior of a group of recipients from prior DCFC charging sessions, and to adjust performance of the charging box over time based on the charging behavior.

The recipient and the donor may each be configured as a battery electric vehicle or a plug-in hybrid electric vehicle, in which case the above-noted DCFC charging session is a vehicle-to-vehicle charging session.

Also disclosed herein is a vehicle-to-vehicle (V2V) charging box for performing a DCFC session of a charge-receiving vehicle ("recipient") by a charge-providing vehicle ("donor"). The V2V charging box may include a portable housing that defines a housing volume and includes inlet and outlet charging ports that are connectable to the donor and the recipient, respectively. The V2V charging box also includes the HV bus, first and second sets of HV contactors connected to the HV bus, and an HV-HV converter connected to the HV bus. The HV-HV converter is configured to output charging power of at least about 50 kilowatts (kW).

The V2V charging box in this embodiment also includes a thermal management system operable for regulating a temperature of the HV-HV converter, as well as a communication processing unit (CPU) configured to establish and maintain two-way communication between the donor and the recipient during the DCFC charging session. The CPU includes corresponding communication stacks for the donor and the recipient, and an application layer connected to the communication stacks to facilitate the two-way communication between the donor and the recipient.

As part of this embodiment, a system controller is configured, during the DCFC charging session, to selectively pre-charge the HV bus between the inlet charging port and the HV-HV converter, to recharge the optional LV energy storage device when used, and to selectively command an offloading of a DC charging current from a battery pack of the donor, through the HV-HV converter, and to a battery pack of the recipient. The high-voltage bus, the first and second sets of HV contactors, the DC-DC converter(s), the CPU, and the system controller are positioned within the housing volume.

A V2V charging method is also disclosed herein, an embodiment of which includes detecting a predetermined electrical connection of the donor and recipient to a V2V charging box via a system controller thereof. The predetermined electrical connection includes a connection of the donor and the recipient to an inlet charging port and an outlet port of a portable housing of the V2V charging box, respectively. The method also includes establishing two-way communication between the donor and the recipient using a communication processing unit (CPU) of the V2V charging box, with the CPU being connected to an LV energy storage device within the V2V charging box. The CPU includes corresponding communication stacks for the donor and the recipient and an application layer connected to the communication stacks to facilitate the two-way communication.

During a V2V charging session, the method includes commanding, via a system controller of the V2V charging box, an HV-LV converter of the V2V charging box to pre-charge an HV bus between the inlet charging port and an HV-HV converter of the V2V charging box, selectively recharging the LV energy storage device via the HV-LV converter, and offloading of a DC charging current from a battery pack of the donor, across a first set of contactors of the V2V charging box, through the HV-HV converter, across a second set of contactors of the V2V charging box, and to a battery pack of the recipient to thereby perform the V2V charging session.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

Figure 1:
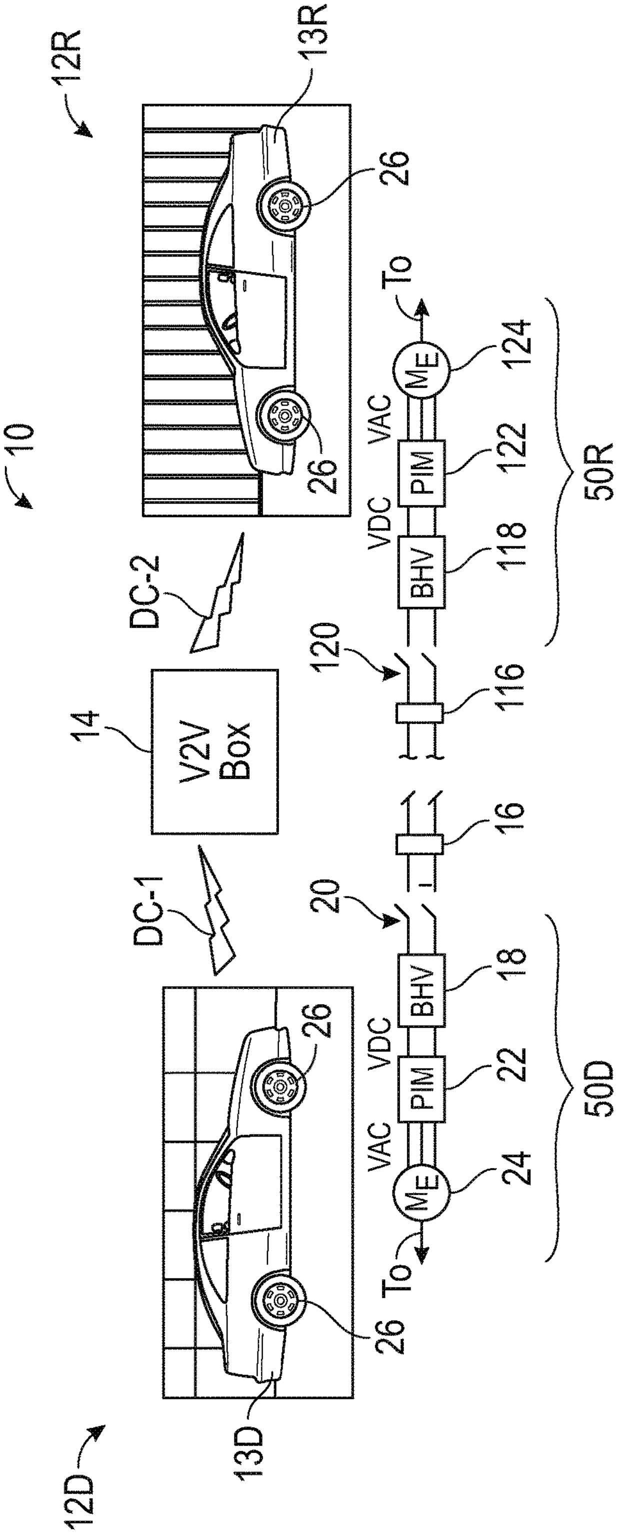
FIG. 1 is an illustration of a representative direct current fast-charging (DCFC) charging session between a charge-providing vehicle ("donor") and a charge-receiving vehicle ("recipient") using the charging box disclosed herein.

The present disclosure may be modified or embodied in alternative forms, with representative embodiments shown in the drawings and described in detail below. Inventive aspects of the present disclosure are not limited to the disclosed embodiments. Rather, the present disclosure is intended to cover alternatives falling within the scope of the disclosure as defined by the appended claims.

DETAILED DESCRIPTION

Referring to the drawings, wherein like reference numbers refer to like features throughout the several views, FIG. 1 depicts a direct current fast-charging (DCFC) operation in the form of a representative vehicle-to-vehicle (V2V) charging session 10. During the V2V charging session 10, a charge-providing electric vehicle (EV), hereinafter referred to as a donor 12D for simplicity, offloads a high-voltage direct current (DC) charging current (DC-1) to a charging box 14, the latter of which is referred to hereinafter as a V2V charging box without limiting the present teachings to vehicular charging applications. The V2V charging box 14 in turn delivers a DC charging current (DC-2) to a charge-receiving electric vehicle, i.e., a recipient 12R. The donor 12D and the V2V charging box 14 together appear, from the perspective of the recipient 12R, as an offboard electric vehicle supply equipment (EVSE) DCFC charging station of type noted above. However, in contrast to offboard EVSE charging stations capable of providing DCFC functionality, the portability and configured functionality of the V2V charging box 14 described below offers owners/operators of EVs and other electrified systems the benefit of enhanced charging mobility and reduced range anxiety, among other attendant benefits.

The donor 12D and the recipient 12R as contemplated herein include a body 13D, 13R and a corresponding electric powertrain system 50D and 50R. In a typical configuration, the donor 12D includes a charging port 16 that is connected to a high-voltage (HV) electrochemical traction battery pack (BHV) 18 via a set of onboard DCFC contactors 20. The battery pack 18 in turn is connected to a power inverter module (PIM) 22. In a discharging mode of the battery pack 18, the battery pack 18 delivers a DC voltage (VDC) to a DC-side of the PIM 22. The PIM 22, using ON/OFF conductive state control of multiple solid-state semiconductor switches (not shown) such as IGBTs, MOSFETs, thyristors, or the like, is driven by pulse-width modulation or another suitable switching control technique.

Switching control of the PIM 22 ultimately converts the DC input voltage from the battery pack 18 into an alternating current voltage (VAC) suitable for energizing phase windings of an electric traction motor ($M_E$) 24, thus causing machine rotation. Output torque (arrow $T_O$) from the electric traction motor 24 is then delivered to one or more road wheels 26 of the donor 12D. The recipient 12R shown in FIG. 1 may be similarly or identically configured to include a corresponding charge port 116, traction battery pack 118, DCFC contactors 120, PIM 122, and electric traction motor 124. Thus, in addition to being equipped to perform the V2V charging session 10 of FIG. 1, the respective electric powertrain systems 50D and 50R are also configured, during separately conducted discharging modes of the battery packs 18 and 118, to electrically propel the corresponding donor 12D and recipient 12R.

Figure 2:
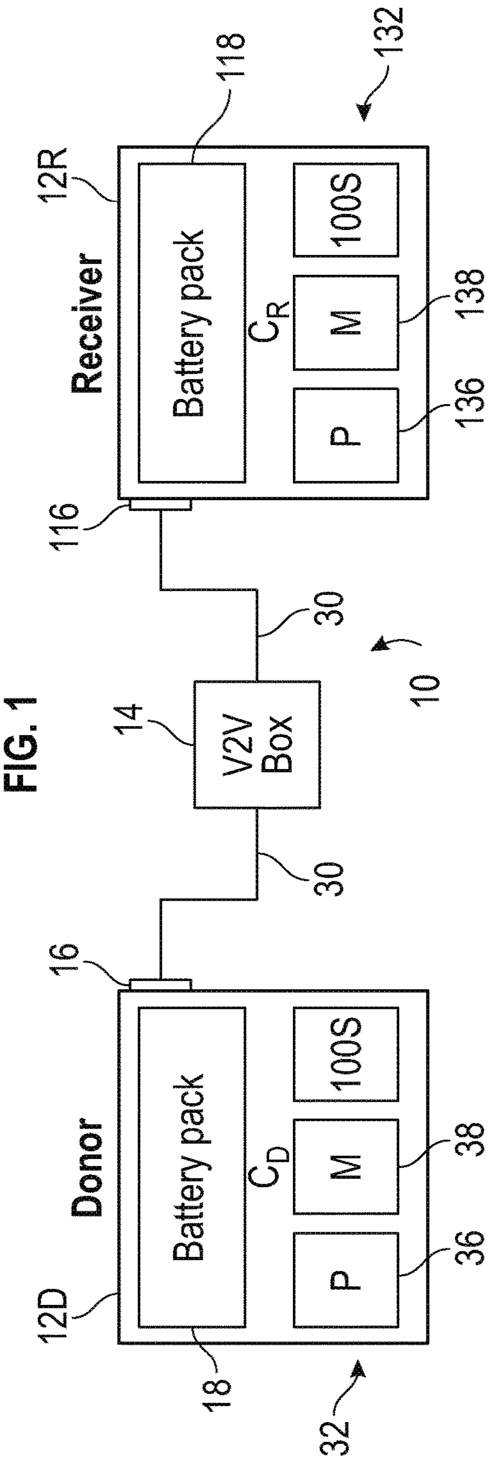
FIG. 2 illustrates a simplified connection of the charging box of FIG. 1.

Referring briefly to FIG. 2, a situation could arise during operation of the recipient 12R in which the traction battery pack 118 could become charge-depleted, at least to the extent that the owner/operator of the recipient 12R requires charging. When this situation occurs, the recipient 12R might not be in proximity to an available EVSE charging station, or to a home or office charging station. In such a scenario, the same owner/operator in accordance with the present teachings could request performance of the V2V charging session 10 as a mobile DCFC charging session. During this event, the portable V2V charging box 14 could be transported to the site of the recipient 12R, e.g., via the donor 12D or another vehicle, and thereafter connected via charging cables 30 and charging ports 16, 116 to the donor 12D and the recipient 12R as described below. The charging ports 16 and 116 could be variously configured to receive SAE J1772, national charging standard (NACS), combined charging system (CCS), CHAdeMO, or other suitable charge connectors depending on the embodiment, and thus are shown generically in FIGS. 1 and 2.

As appreciated in the art and noted above, the donor 12D and the recipient 12R are respectively equipped with the above-noted traction battery packs 18 and 118. Additionally, the donor 12D would include an onboard vehicle controller 32 ($C_D$) having one or more processors (P) 36, memory (M) 38, and an instruction set 100S embodying the present method 100 of FIGS. 4A-C. The recipient 12R is similarly equipped with a vehicle controller 132 ($C_R$), processor(s) (P) 136, and memory (M) 138, with a corresponding version of the instruction set 100S. Thus, the donor 12D and the recipient 12R are equipped to communicate via the exchange of data during the V2V session 10, manage and coordinate powerflow, monitor for proper connection of the charging cables 30 and other conditions/error states, regulate temperature of the V2V charging box 14, and perform other relevant functions during the V2V charging session 10 as described below.

To perform the functions of the present method 100, e.g., by executing one or more algorithms and automated and/or manual process steps as set forth below, such functions could be embodied computer-readable instructions, i.e., the instruction set 100S, from a tangible, non-transitory computer-readable storage medium portion of the associated memory 38 and 138. For instance, the memory 38 and 138 could include magnetic or optical media, CD-ROM, and/or solid-state/semiconductor memory (e.g., various types of RAM or ROM). The term "vehicle controller" and related terms such as control module, control unit, processor, and similar terms may refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). Non-transitory components of the memory 38 and 138 used herein are capable of storing machine-readable instructions in the form of one or more software or firmware programs or routines, combinational logic circuit(s), input/output circuit(s) and devices, signal conditioning and buffer circuitry and other components that can be accessed by one or more processors 34 and 134 to provide a described functionality.

Still referring to FIG. 2, the V2V charging box 14 as contemplated herein is configured in a representative embodiment to output a rated charging power of at least about 50-100 kilowatts (kW) of continuous power, and about 150-300 amps (A) of continuous output current. In a possible construction, the V2V charging box 14 could receive about 350-1000V or more from the donor 12D, and in response, may output about 150-1000V or more to the recipient 12R, with other voltage ranges being possible depending on the embodiment. The V2V charging box 14 is also configured with buck/boost capabilities to enable the V2V charging box 14 to decrease (buck) or increase (boost) the DC voltage (DC-1 of FIG. 1) provided from the donor 12D, with the V2V charging box 14 doing so based on state of charge (SOC) or voltage capability of the traction battery pack 118 of the recipient 12R, an amount of requested power, power capability/SOC/voltage capability of the donor 12D, and other factors.

Figure 3:
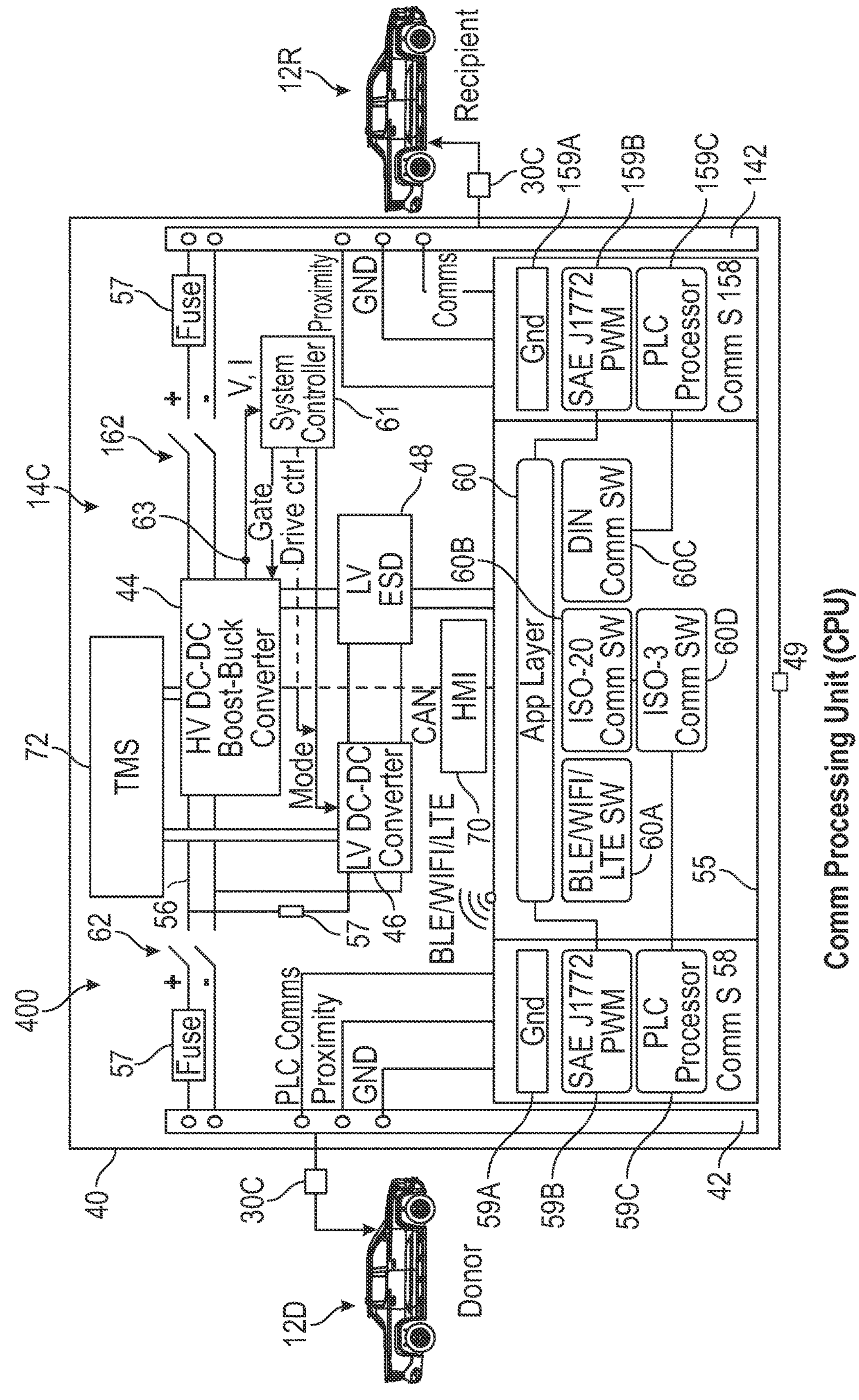
FIG. 3 depicts a representative embodiment of the charging box shown in FIGS. 1 and 2.

Referring now to FIG. 3, mobile plug-in DCFC functions as contemplated herein involve the coordinated two-way communication of data between the donor 12D and the recipient 12R. Data exchange takes the form of a low-voltage control pilot or communications (Comms) signal, typically in the range of 0-12V, and a proximity voltage (Prox) signal of 0-5V. An electrical ground (GND) is also provided. An established J1772 connection, for instance, allows respective processors of the donor 12D and the recipient 12R to communicate with each other using Power Line Communication (PLC) for the comms signal, which in turn progresses in accordance with an established communications protocol via a coordinated exchange of data messages. The comms signal is ordinarily used to verify a connection between an offboard EVSE charging station and a charging EV, whose respective places are taken herein by the donor 12D and the V2V charging box 14 (together acting as such an EVSE charging station) and the recipient 12R, to communicate charging states. This may occur, e.g., using a fixed duty cycle during the contemplated DC charging. The same signal may be used to adjust the charging rate as needed. Other standards such as the above-noted NACS, CCS, CHAdeMO, etc., may be used in a similar vein, and therefore the particular charging standard may vary with the desired end use.

Multi-pin charging plugs 30C disposed the charging cables 30 are connected to a corresponding one of the charging ports 16, 116 located on the donor 12D and recipient 12R, respectively (see FIG. 1). In accordance with the relevant charging protocol, DC charging power is fed through conductive pins of the charging port 16 of the donor 12D, across the V2V charging box 14, and into the traction battery pack 118 of the recipient 12R. The DCFC charging process is coordinated via an exchange of data/messages between the processor 36 of the donor 12D of FIG. 2, a processor or system controller 61 of the V2V charging box 14, and the corresponding processor 136 the recipient 12R, e.g., a Battery Management System or another battery controller. The above-noted comms and proximity signals are exchanged between the processors 36, 136, and 61, with the general process of DC charging under DIN 70121 or other relevant protocols being well understood in the art. Also as understood in the art, such protocols proceed in accordance with a defined multi-step electronic "handshaking" process before permitting transfer of energy, with this process also noted below in the description of the method 100.

V2V CHARGING BOX CONTENTS: the V2V charging box 14 illustrated in FIG. 2, which is configured to function as a DCFC accessory for performing a V2V charging event/session, may include a portable housing 40, for instance a weatherproof, rugged, and sufficiently lightweight enclosure constructed, e.g., of molded plastic, aluminum, steel, etc. Portability of the housing 40 may be facilitated by connecting or affixing wheels and/or handles (not shown) to the housing 40. The housing 40 is also connected to respective inlet and outlet charging ports 42 and 142, which in turn are respectively connectable to the donor 12D and the recipient 12R during the V2V session 10.

The housing 40 defines a housing volume 400. One or more direct current-to-direct current (DC-DC) converters are arranged in the housing volume 400 and connected to the housing 40 for secure transport and operation. In the illustrated embodiment of FIG. 3, such converters include a high-voltage-to-high-voltage (HV-HV) converter 44, e.g., an HV buck-boost converter, and a high-voltage-to-low-voltage (HV-LV) converter 46. An optional LV energy storage device 48, e.g., an electrochemical battery pack, an ultracapacitor, or a supercapacitor in different implementations, could be connected to a low-voltage side of the HV-LV converter 46 as shown, or LV power could be provided separately, e.g., via a plug-in connection to onboard/on-vehicle 12-15V power. The optional LV energy storage device 48 when used is also electrically connected to the HV-HV converter 44 to provide low-voltage (e.g., nominal 12-15V) power suitable for opening/closing HV disconnect devices 62 and 162, and for powering voltage or current sensors 63 and associated circuit and diagnostic components. The connection of the LV energy storage device 48 and the HV-LV converter 46 also enables the HV-LV converter 46 to selectively charge the LV energy storage device 48 during the V2V charging session 10. The optional LV energy storage device 48 may also be recharged via AC grid power in some configurations, e.g., by plugging the housing 40 into an available wall socket via a corresponding charging outlet 49 arranged thereon. The use of such an AC outlet 49 would enable charging of the LV energy storage device 48 from wall-connected adapter/AC outlet (not shown) in the donor 12D, which may be particularly useful when the V2V charging box 14 has been idle for an extended period between V2V charging sessions 10.

The V2V charging box 14 illustrated in FIG. 3 also includes a communication processing unit (CPU) 55 operable for establishing and maintaining two-way communication between the donor 12D and the recipient 12R during the V2V charging session 10. Separate communication circuits/stacks or "comm stacks" 58 and 158 (Comm S) may be included in the CPU 55, with an application layer 60 arranged therebetween to coordinate wired/wireless data exchange. Comm stacks 58 and 158 in the non-limiting embodiment of FIG. 3 may include different connections and components, e.g., a ground (GND) connection 59A, an SAE J1772 PWM block 59B, and a PLC processor 59C for comms stack 58, or equivalent structure in other embodiments, and corresponding ground connection 159A, PWM block 159B, and process 159C for the comms stack 158.

To that end, the CPU 55 may be equipped, during the V2V charging session 10, to coordinate with the above-noted processors 36 and 136 of the respective donor 12D and recipient 12R. Communication is facilitated via one or more communication modules connected to/usable with the application layer 60, e.g., a BLE/WiFi/LTE software module 60A, ISO-20 communications software module 60B, DIN communications software module 60C, and ISO-3 communications software module 60D as shown in the non-limiting example construction of FIG. 3. As appreciated in the art, such software is typically used during EV charging to facilitate the wireless exchange of data, and thus is well understood in the art.

Using the comms stacks 58 and 158, the application layer 60, and the associated software modules 60A, 60B, and 60*c*, the CPU 55 is able to command the HV-LV converter 46 to pre-charge an HV bus 56 of the V2V charging box 14 to a level equal to that of an HV bus located on the donor 12D, and in selectively recharging the LV energy storage device 48 via the HV-LV converter 46 as needed. Additionally, the CPU 55 in close coordination with the processors 36 and 136 of FIG. 2 selectively commands offloading of a DC charge from the traction battery pack 18 of the donor 12D of FIGS. 1 and 2 to the traction battery pack 118 of the recipient 12R through operation of the HV-HV converter 44. The DC-DC converter(s), i.e., the HV-HV converter 44 and the optional HV-LV converter 46, along with the optional LV energy storage device 48, the CPU 55, the system controller 61, and associated hardware and software collectively form a V2V charging circuit 14C positioned within the housing volume 400, with the system controller 61 for its part including one or more processors, memory, and other hardware as specified above.

Still referring to FIG. 3, the V2V charging box 14 and its resident charging circuit 14C include first and second sets of HV disconnect devices 62 and 162, respectively. The HV-HV converter 44 is connectable on positive and negative HV rails (+, −) between the inlet charging port 42 and the outlet charging port 142 via the first and second sets of HV disconnect devices 62 and 162, respectively. Fault isolation devices 57 such as fuses, pyrotechnic switches, or e-fuses may be arranged as shown to provide additional high-voltage protection.

Other components of the V2V charging box 14 may include a human-machine interface (HMI) 70 connected to the portable housing 40 and configured to facilitate interaction-machine interactions during the course of the V2V session 10 of FIGS. 1-3. The HMI 70 could receive user inputs to the system controller 61 during the V2V charging session 10, and to display information pertaining to the V2V charging session 10 for viewing by users of the V2V charging box 14. For example, the HMI 70 could include one or more display screens, alphanumeric touchscreens, push button keyboards, and/or other peripheral devices that present prompts and sequential instructions for the owner/operator to follow. The HMI 70 could likewise present information to the user(s), such as the current communication and charge offloading statuses of the V2V session 10, SOC, voltage, or other status of the traction battery packs 18 and 118 of the respective donor 12D and recipient 12R, charging time and offloaded power total, etc. A controller area network (CAN) bus may be included in the architecture of the V2V charging box 14 to communicate between the various modules or devices using low-voltage differential signals.

Additionally, a thermal management system (TMS) 72 could be incorporated into the V2V charging box 14 or connected thereto to regulate the temperature of high-voltage and other components contained therein, in particular the HV-HV converter 44 and the optional HV-LV converter 46. By way of example and not of limitation, the thermal management system 72 could include a heat sink with conductive and/or forced convective devices, e.g., cooling plates, fans, etc., fluidic means such as coolant loops/pumps, cooling blankets, and the like. In some implementations, the thermal management system 72 could include optional phase change materials to optimize mass, transient heat rejection capability, etc.

In general, the method 100 described below includes detecting a predetermined electrical connection of the donor 12D and recipient 12R to the charging box 14 via the system controller 61 thereof, with the predetermined electrical connection including a connection of the donor 12D and the recipient 12R to the respective inlet charging port 42 and the outlet port 142 of the portable housing 40 shown in FIG. 3.

The method 100 also includes establishing two-way communication between the donor 12D and the recipient 12R using the CPU 55 of the charging box 14 as described above. During the V2V charging session 10, the method 100 may include commanding, via the system controller 61 of the charging box 14, the HV-LV converter 46 (when used) to pre-charge the HV bus 56 between the inlet charging port 42 and the HV-HV converter 44, selectively recharging the optional LV energy storage device 48 via the HV-LV converter 46. The method 100 may also include offloading a DC charging current from the battery pack 18 of the donor 12D, across the first set of disconnect devices 62, e.g., HV contactors of the charging box 14, through the HV-HV converter 44, across the second set of disconnect devices 162 of the charging box 14, and to the battery pack 118 of the recipient 12R to thereby perform the V2V charging session 10. Gate drive signals, mode control signals, and controller area network (CAN) messages may be used by the system controller 61 for such purposes as shown in FIG. 3. A more specific implementation will now be described with reference to FIGS. 4A-4C.

Figure 4A:
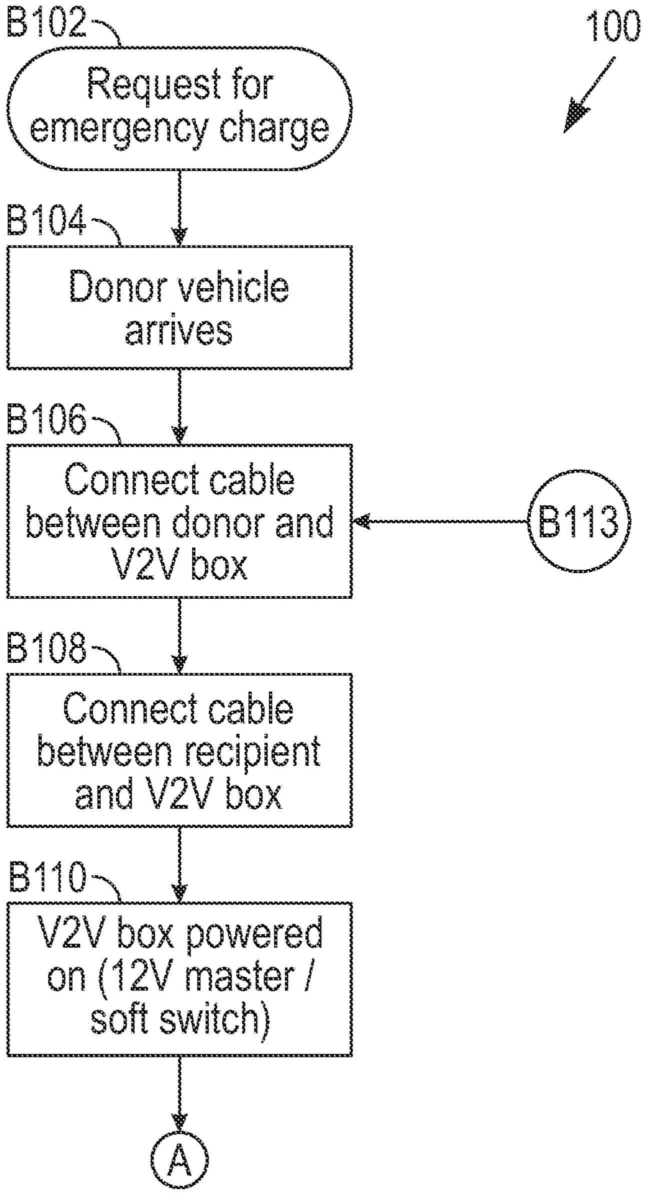
FIGS. 4A, 4B, and 4C collectively form a flow chart describing a method for using the charging box of FIGS. 1-3 during a representative V2V charging session.
Figure 4B:
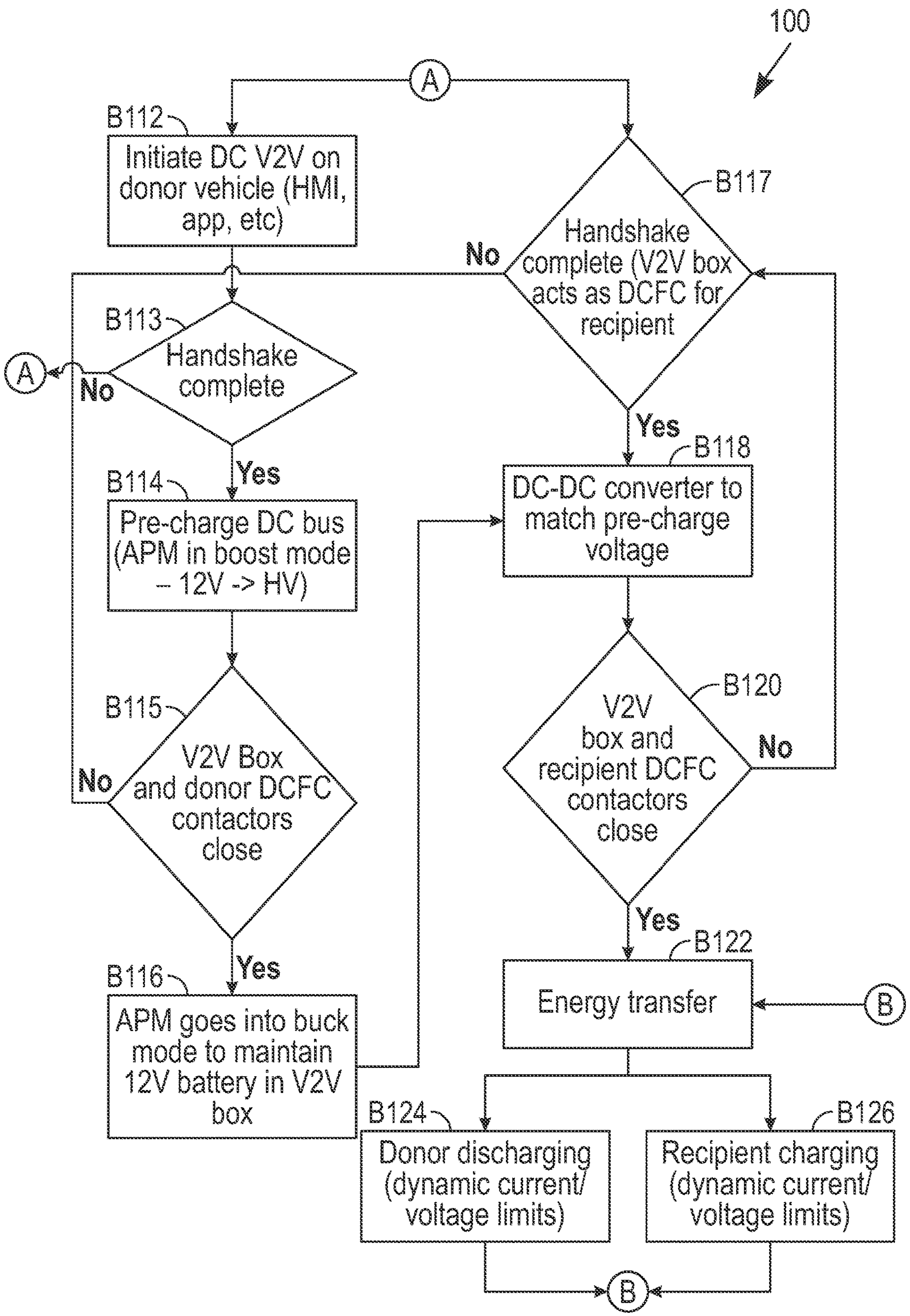
Figure 4C:
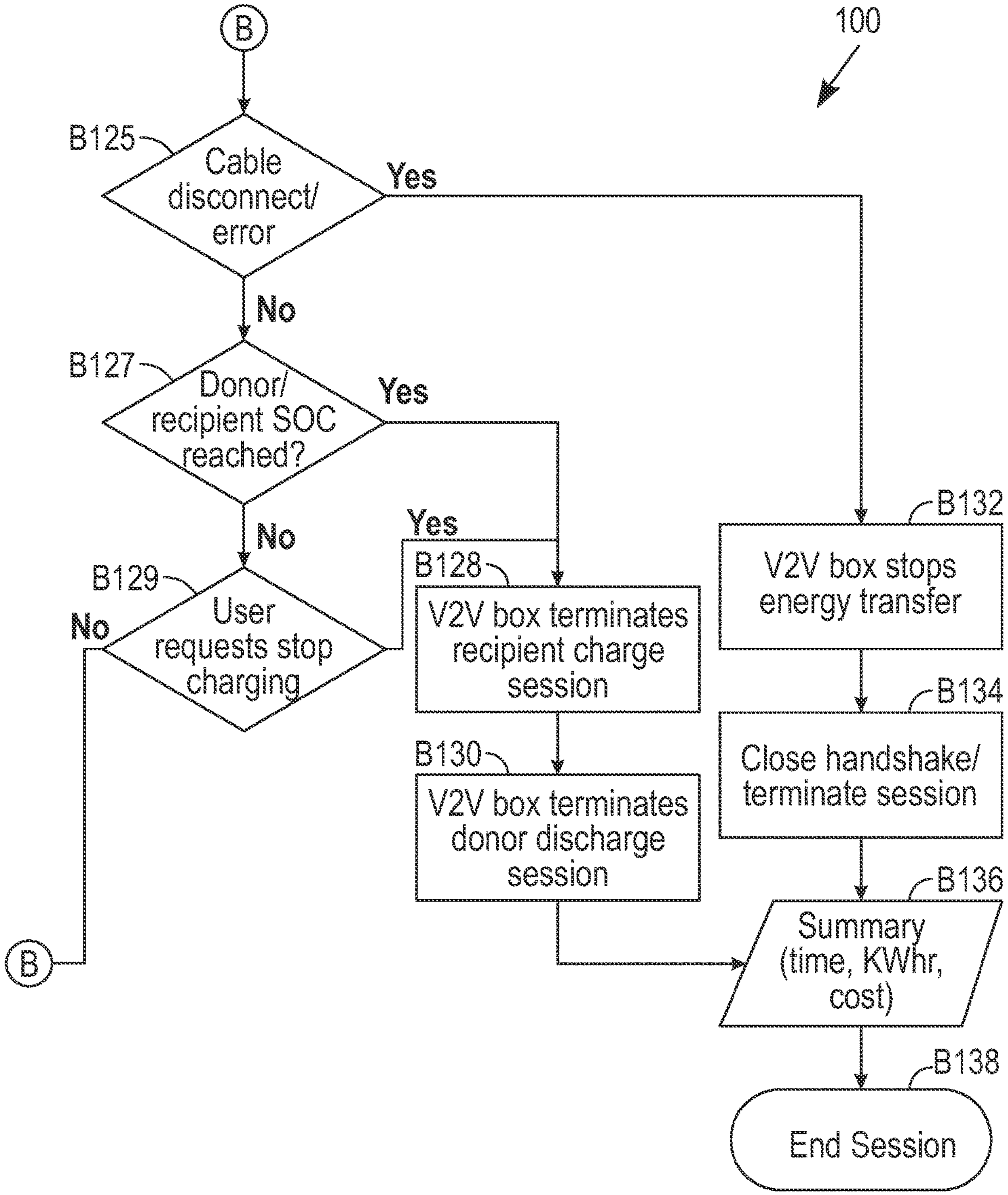

Referring to FIGS. 4A, 4B, and 4C, these three Figures collectively represent an embodiment of the method 100 using discrete process steps, segments, or blocks for clarity. Each constituent block of the method 100 may be implemented in the sequence set forth herein to conduct the V2V charging session 10 using the hardware of FIG. 3.

Referring first to FIG. 4A, the method 100 commences with block B102 with a request for an emergency charge of the charge-receiving vehicle or recipient 12R of FIGS. 1-3. For example, an owner/operator of the recipient 12R could transmit a request to an owner/operator of the charge-providing vehicle or donor 12D, request a V2V charging session via a text message or phone call, using OnStar®, or otherwise signal a need or desire for a mobile DCFC event. The method 100 then proceeds to block B104.

At block B104, the donor 12D arrives on site and is parked in proximity to the recipient 12R. The donor 12D in this instance could pull up in front of or next to the recipient 12R such that the charging ports 16 and 116 are readily accessible to one other. The method 100 thereafter proceeds to block B106.

Block B106 of FIG. 4A includes connecting the charging cable 30 to the donor 12D and the V2V charging box 14 of FIGS. 1-3. For example, the charging cable 30 could be a CCS/NACS charging cable as noted above, in which case one end of the cable 30 could be plugged into the charging port 16 on the donor 12D, and an opposing end of the same cable 30 could be plugged into the inlet charging port 42 on the V2V charging box 14 (see FIG. 3). Block B106 may also be reached from block B113 of FIG. 4A as part of the method 100 as described in detail below. The method 100 proceeds from block B106 to block B108 once the charging cable 30 has been securely connected between the donor 12D and the V2V charging box 14.

At block B108, which is analogous to block B106, another charging cable 30 is connected between the outlet charging port 142 of the V2V charging box 14 and the charging port 116 of the recipient 12R. Thus, upon completion of block B108 the donor 12D is electrically connected to the recipient 12R via the intervening V2V charging box 14. The method 100 thereafter proceeds to block B110.

Block B110 of FIG. 4A includes turning on the V2V charging box 14 such that the V2V charging box is energized with low voltage power. For instance, a soft or hard switch could be activated by the user of the V2V charging box 14 to deliver the low-voltage power from the LV energy storage device 48 of FIG. 3 to the CPU 55 and other low-power devices, or from another 12V power supply. Upon completion of block B110, the method 100 of FIG. 4A reaches point A in the illustrated process flow.

Referring now to FIG. 4B, and commencing with point A (see FIG. 4A), the method 100 proceeds to blocks B112 to commence functions of the donor 12D, and to block B117 to commence functions of the recipient 12R. Here, the V2V session 10 of FIGS. 1-3 is initiated. For instance, the human-machine interface (HMI) 70 of the V2V charging box 14 could be accessed, either directly or via a portable electronic device such as a smartphone or tablet computer. The user could request an offloading of high-voltage power from the traction battery pack 18 of the donor 12D, which would then initiate the remaining charging sequence. The method 100 proceeds to block B113 upon completion of block B112.

Block B113 entails determining whether an electronic handshake signal, e.g., a Transport Layer Security (TLS) handshake, has been received from the recipient 12R by the donor 12D. As appreciated in the art, such a handshake signal is often used to establish an encrypted two-way communication session between a charge provider and a charge recipient during EV charging. This is extended to the present DCFC/V2V charging scenario. The method 100 proceeds to block B114 when the handshake signal has been received by the donor 12D, and to block B106 of FIG. 4A in the alternative when the handshake signal is not detected.

At block B114 of FIG. 4B, after confirming receipt of the electronic handshake signal at preceding block B113, the recipient 12R communicates its power and current limits to the V2V charging box 14 over the established power line connection through the intervening charging cable 30. In turn, the V2V charging box 14 communicates the power and current limits of the donor 12D and V2V charging box 14 to the recipient 12R, such that the recipient 12R views the combination of the donor 12D and V2V charging box 14 as being a single charging unit, i.e., analogous to an offboard EVSE charging station. The V2V charging box 14 responds to the successful handshake by pre-charging the DC bus 56 of FIG. 3. To do so, the HV-LV converter 46 of FIG. 3 is operated in boost mode, such that internal switching and power transforming operations of the HV-LV converter 46 are used to increase the voltage level of the LV energy storage device 48 to match the high-voltage level of the donor 12D. The method 100 thereafter proceeds to block B115.

Block B115 entails determining, via the system controller 61 of the V2V charging box 14, whether the DCFC contactors 20 (FIG. 2) located aboard the donor 12D are closed, and also whether the first set of disconnect devices 62 of the V2V charging box 14 of FIG. 3 are likewise closed. The method 100 proceeds to block B106 of FIG. 4A when the DCFC contactors 20 or the disconnect devices 62 of the V2V charging box 14 are not closed, and to block B116 in the alternative when the DCFC contactors 20 and the disconnect devices 62 are both in a closed state.

Block B116 is performed when the DCFC contactors 20 aboard the donor 12D and the first set of disconnect devices 62 of the V2V charging box 14 are closed. In this case, the system controller 61 transitions the HV-LV converter 46 into a voltage-reducing "buck" mode to maintain the LV energy storage device 48 at a calibrated low voltage level, e.g., nominally 12-15V as noted above. The method 100 proceeds to block B118 once the buck mode has been enacted.

At block B117, which is analogous to block B113, the system controller 61 of the V2V charging box 14 verifies that the handshake signal has been received from the donor 12D. In this case, the V2V charging box 14 acts for resident logic of the recipient 12R. The method 100 proceeds to block B118 when the handshake signal has been received, and to block B106 of FIG. 4A when the expected handshake signal is not detected.

Block B118 of FIG. 4B entails commanding the HV-HV converter 44 of the V2V charging box 14 to match the pre-charge voltage from block B114. As the particular voltage requirements of the recipient 12R could vary for a given charging event, the HV-HV converter 44 in block B118 could function in either a buck mode (voltage-increasing) or a boost mode (voltage-reducing) as needed. The method 100 then proceeds to block B120.

At block B120, the DCFC contactors 120 of the recipient 12R are verified as having been closed in a process step that is analogous to that performed in block B115. In response, the method 100 proceeds to block B122. The method 100 otherwise repeats block B117.

At block B122, the energy transfer process initiates in response to the forgoing process steps. The system controller 61, working in concert with the controllers 32 and 132 of FIG. 2, commands a high-voltage DC charge to be offloaded from the traction battery pack 18 of the donor 12D, through the intervening V2V charging box 14, and to the traction battery pack 118 of the recipient 12R. Block B122 may also be reached from block B129 of FIG. 4C as described below. As this process continues, the method 100 proceeds to blocks B124 and B126.

Blocks B124 and B126 of FIG. 4B entail discharging the traction battery pack 18 of the donor 12D and charging the traction battery pack 118 of the recipient 12R, respectively. The method 100 thus reaches point B in the illustrated process flow.

Referring now to FIG. 4C, and beginning at point B, the method 100 proceeds to block B125. Here, the CPU 55 and/or other involved circuitry of the donor 12D and recipient 12R scan for a cable/disconnect error. Such an error could arise if either of the charging cables 30 should become loose or disconnected. The method 100 proceeds to block B132 in the event such an error is detected. The method 100 proceeds in the alternative to block B127 in the absence of such an error.

At block B127, the system controller 61 of FIG. 3 verifies whether a respective state of charge (SOC) of the donor 12D and recipient 12R has reached a predetermined SOC limit. If so, the method 100 proceeds to block B128, with the method 100 otherwise continuing to block B129.

Block B128, which is reached when the SOC of the donor 12D or recipient 12R reaches the predetermined SOC limit of block B127, includes terminating the DCFC charging event from the standpoint of the recipient 12R. This could entail transmitting the requisite signals from the comms stack 158 to the V2V charging box 14 indicating the recipient 12R no longer requires charging. As part of block B128, the system controller 61 may command the disconnect device 162 to open, thus breaking the high-voltage connection between the V2V charging box 14 and the recipient 12R. Aboard the recipient 12R, the DCFC contactors 120 of FIG. 1 are likewise commanded to open. The method 100 then proceeds to block B130.

At block B129, the system controller 61 of the V2V charging box 14 next determines whether a user has requested termination of the V2V session 10. For example, the owner/operator of the donor 12D or recipient 12R could communicate a desire to stop the V2V charging session 10 via wireless or HMI-based communication with the CPU 55, e.g., via the HMI 70 of FIG. 3 and/or via an app as noted above. The method 100 proceeds to block B128 when the user requests that the V2V charging session 10 should cease.

Block B130, analogous to block B128, entails terminating the V2V session 10 from the standpoint of the donor 12D. This process is performed in close coordination with the above-described process of block B128. The method 100 thereafter proceeds to block B136.

At block B132 of FIG. 4C, in response to the cable/disconnect error detected in block B125, the V2V charging box 14 of FIGS. 1-3 discontinues its energy transfer to the recipient 12R. The method 100 then proceeds to block B134.

Block B134 entails discontinuing the above-described handshake signal and terminating the V2V charging session 10. The method 100 thereafter proceeds to optional block B136.

Block B136 of FIG. 4C may be used in one or more embodiments to quantify the recently completed V2V session 10, and thereafter ending the V2V charging session 10 at block B138. For instance, the V2V charging box 14 or use thereof could involve communication with an offline or backend payment system, e.g., processing of a debit card or credit card, use of a mobile payment application accessible via a user device such as a smartphone or tablet computer, etc. Cloud connectivity facilitated by a local WiFi connection, Long Term Evolution (LTE), BLUETOOTH, or other suitable data transfer connection to offload data descriptive of the V2V session 10 to a backend server to quantify the V2V charging session 10. That is, the system controller 61 may be configured to quantify the V2V charging session 10 as a quantified session upon completion thereof, to generate a summary of charges for the V2V charging session 10 based on the quantified session. The system controller 61 could then communicate the summary of charges to a user of the recipient 12R. This would enable a provider of the mobile DCFC via the V2V charging box 14 to be compensated for the cost thereof.

Similar technology could likewise facilitate communication with other vehicles/devices. To that end, the V2V charging box 14 shown in FIGS. 1-3 could be assigned a unique alphanumeric identifier, which in turn would allow the above-noted backend server to pinpoint the specific parties involved in the V2V charging session 10. This in turn would enable the party with dominion over the V2V charging box 14 to thereafter charge for or deduct payment for the completed V2V charging session 10 using established digital payment methods. For example, block B136 could include outputting a summary of and/or an invoice for the elapsed charging time/duration, state of health of the traction battery pack 118, the total charging power provided to the recipient 12R, and the associated cost of providing such charging power to the recipient 12R.

Optionally, the V2V charging box 14 or the above-noted backend server could be configured to create unique user profiles of charging parameters for a given population of recipients 12R, such as similarly equipped EVs. The V2V charging box 14 could use adaptive self-learning algorithm or other techniques to analyze the collective charging behavior of such a group of recipients 12R from prior V2V sessions 10, which would enable the V2V charging box 14 to adjust the performance of the V2V charging box 14 and improve the charging experience for future usages. The method 100 is complete upon completion of the optional quantification/monetization process of block B134. The LV energy storage device then goes into a low-power standby mode until the V2V charging box 14 is again needed for a subsequent V2V charging session.

The mobile DCFC-related hardware and software solutions described above thus provide an electrical architecture that enables energy transfer to occur between two EVs or other battery electric systems equipped having a high-voltage rechargeable energy storage system, exemplified herein as the traction battery packs 18 and 118 of FIGS. 1 and 2. The foregoing solutions expedite charging relative to speeds typically associated with AC-based V2V charging or EVSE station-driven DCFC operations. The portability of the initially self-powered V2V charging box 14 and its configured DCFC capabilities together enable faster, more flexible, and user-convenient DCFC charging in a V2V context relative to such alternative approaches. These and other attendant benefits will be readily understood by those skilled in the art in view of the foregoing disclosure.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A charging box for performing a direct current fast charging (DCFC) session of a charge-receiving system ("recipient") by a charge-providing system ("donor"), the charging box comprising:

a portable housing having an inlet charging port and an outlet charging port that are connectable to the donor and the recipient, respectively;

a high-voltage (HV) bus;

first and second sets of HV disconnect devices connected to the HV bus and configured to respectively connect or disconnect the respective inlet and outlet charging ports to or from the HV bus;

at least one direct current-to-direct current (DC-DC) converter connected to the portable housing, including a high-voltage-to-high-voltage (HV-HV) converter connected to the HV bus;

a communication processing unit (CPU) connectable to a low-voltage energy storage device and configured to establish and maintain two-way communication between the donor and the recipient during the DCFC session; and a system controller configured, during the DCFC session, to selectively pre-charge the HV bus between the inlet charging port and the HV-HV converter, and to selectively command an offloading of a DC charging current from a battery pack of the donor, through the HV-HV converter, and to a battery pack of the recipient, wherein the system controller is configured to perform an adaptive self-learning algorithm to analyze charging behavior of a group of recipients from prior DCFC sessions, and to adjust performance of the charging box over time based on the charging behavior.

2. The charging box of claim 1, wherein the portable housing defines a housing volume, and wherein the at least one DC-DC converter, the CPU, and the system controller collectively form a charging circuit positioned within the housing volume.

3. The charging box of claim 1, wherein the first and second sets of HV disconnect devices include a first set of HV contactors and a second set of HV contactors connected to the inlet charging port and the outlet charging port by a corresponding fuse.

4. The charging box of claim 1, further comprising:

an LV energy storage device, wherein the at least one DC-DC converter includes a high-voltage-to-low-voltage (HV-LV) converter connected to the HV-HV converter a low-voltage (LV) energy storage device connected to the portable housing and the HV-LV converter, and wherein the system controller is configured to recharge the LV energy storage device via the HV-LV converter.

5. The charging box of claim 4, wherein the LV energy storage device includes a 12-15 volt battery pack, ultracapacitor, or supercapacitor.

6. The charging box of claim 1, wherein the HV-HV converter is a buck-boost converter.

7. The charging box of claim 1, further comprising:

a human-machine interface (HMI) connected to the portable housing, wherein the HMI is configured to receive user inputs to the system controller during the DCFC session, and to display information pertaining to the DCFC session.

8. The charging box of claim 1, further comprising:

a thermal management system operable for regulating a temperature of the multiple DC-DC converters.

9. The charging box of claim 1, wherein the CPU includes corresponding communication stacks for the donor and the recipient, and an application layer connected to the communication stacks to facilitate the two-way communication between the donor and the recipient.

10. The charging box of claim 1, wherein the system controller is configured to quantify the DCFC session as a quantified session upon completion thereof, to generate a summary of charges for the DCFC session based on the quantified session, and to communicate the summary of charges to a user of the recipient.

11. The charging box of claim 1, wherein the system controller is configured to initiate the DCFC session upon confirming receipt of an electronic handshake signal from the recipient, wherein the electronic handshake signal comprises a Transport Layer Security (TLS) handshake.

12. The charging box of claim 1, wherein the recipient and the donor are both configured as a battery electric vehicle or a plug-in hybrid electric vehicle, and wherein the DCFC session is a vehicle-to-vehicle session.

13. A vehicle-to-vehicle (V2V) charging box for performing a direct current fast charging (DCFC) session of a charge-receiving vehicle ("recipient") by a charge-providing vehicle ("donor"), the V2V comprising:

a portable housing that defines a housing volume, the portable housing having an inlet charging port and an outlet charging port that are connectable to the donor and the recipient, respectively;

a high-voltage (HV) bus;

first and second sets of HV contactors connected to the HV bus, and configured to connect/disconnect the respective inlet and outlet charging ports to/from the HV bus;

a high-voltage-to-high-voltage (HV-HV) converter connected to the HV bus and configured to output charging power of at least about 50 kilowatts (kW);

a thermal management system operable for regulating a temperature of the HV-HV converter;

a communication processing unit (CPU) configured to establish and maintain two-way communication between the donor and the recipient during the DCFC session, wherein the CPU includes corresponding communication stacks for the donor and the recipient, and an application layer connected to the communication stacks to facilitate the two-way communication between the donor and the recipient; and a system controller configured, during the DCFC session, to selectively pre-charge the HV bus between the inlet charging port and the HV-HV converter, and to selectively command an offloading of a DC charging current from a battery pack of the donor, through the HV-HV converter, and to a battery pack of the recipient, wherein the high-voltage bus, the first and second sets of HV contactors, the HV-HV converter, the CPU, and the system controller are positioned within the housing volume, and wherein the system controller is configured to perform an adaptive self-learning algorithm to analyze charging behavior of a group of recipients from prior DCFC sessions, and to adjust performance of the charging box over time based on the charging behavior.

14. The V2V charging box of claim 13, further comprising:

a high-voltage-to-low-voltage (HV-LV) converter connected to the HV-HV converter; and a low-voltage (LV) energy storage device connected to the portable housing and the HV-LV converter, wherein the system controller is configured to recharge the LV energy storage device via the HV-LV converter.

15. The V2V charging box of claim 13, further comprising:

a human-machine interface (HMI) connected to the portable housing, wherein the HMI is configured to receive user inputs to the system controller during the V2V charging process, and to display information pertaining to the V2V charging process, wherein the system controller is configured to quantify the DCFC charging session as a quantified session upon completion thereof, to generate a summary of charges for the DCFC session based on the quantified session, and to communicate the summary of charges to a user of the recipient via the HMI.

16. The V2V charging box of claim 13, wherein the system controller is configured to initiate the DCFC session upon confirming receipt of an electronic handshake signal from the recipient, wherein the electronic handshake signal comprises a Transport Layer Security (TLS) handshake.

17. A vehicle-to-vehicle (V2V) charging method, comprising:

detecting a predetermined electrical connection of a charge-providing vehicle ("donor") and a charge-receiving vehicle ("recipient") to a vehicle-to-vehicle (V2V) charging box via a system controller thereof, the predetermined electrical connection including a connection of the donor and the recipient to an inlet charging port and an outlet port of a portable housing of the V2V charging box, respectively;

establishing two-way communication between the donor and the recipient using a communication processing unit (CPU) of the V2V charging box, the CPU being connected to a low-voltage (LV) energy storage device within the V2V charging box, wherein the CPU includes corresponding communication stacks for the donor and the recipient and an application layer connected to the communication stacks to facilitate the two-way communication;

during a V2V charging session:

commanding, via a system controller of the V2V charging box, a high-voltage-to-low-voltage (HV-LV) converter of the V2V charging box to pre-charge an HV bus between the inlet charging port and a high-voltage-to-high-voltage (HV-HV) converter of the V2V charging box;

selectively recharging the LV energy storage device via the HV-LV converter; and offloading of a DC charging current from a battery pack of the donor, across a first set of contactors of the V2V charging box, through the HV-HV converter, across a second set of contactors of the V2V charging box, and to a battery pack of the recipient to thereby perform the V2V charging session; and performing an adaptive self-learning algorithm via the system controller to analyze charging behavior of a group of recipients from prior DCFC sessions, and adjusting performance of the V2V charging box over time based on the charging behavior.

18. The method of claim 17, further comprising:

regulating a temperature of HV-HV converter and the HV-LV converter via a thermal management system of the V2V charging box during the V2V charging session.

19. The method of claim 17, further comprising:

quantifying the V2V charging session, via the system controller, as a quantified session upon completion of the V2V charging session;

generating a summary of charges for the V2V charging session based on the quantified session; and communicating the summary of charges to a user of the recipient.

20. The method of claim 17, wherein the establishing two-way communication between the donor and the recipient includes confirming receipt of an electronic handshake signal from the recipient, wherein the electronic handshake signal comprises a Transport Layer Security (TLS) handshake.

* * * * *